US012594550B2

(12) United States Patent
Hirawake et al.

(10) Patent No.: US 12,594,550 B2
(45) Date of Patent: Apr. 7, 2026

(54) BIOLOGICAL SAMPLE HOLDING CONTAINER AND BIOLOGICAL SAMPLE HOLDING METHOD

(71) Applicant: HAMAMATSU PHOTONICS K.K., Hamamatsu (JP)

(72) Inventors: Kazumasa Hirawake, Hamamatsu (JP); Takahiro Murakoshi, Hamamatsu (JP); Takahiro Shikayama, Hamamatsu (JP); Takayuki Sato, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 1032 days.

(21) Appl. No.: 17/767,991

(22) PCT Filed: Jul. 16, 2020

(86) PCT No.: PCT/JP2020/027687
§ 371 (c)(1),
(2) Date: Apr. 11, 2022

(87) PCT Pub. No.: WO2021/124605
PCT Pub. Date: Jun. 24, 2021

(65) Prior Publication Data

US 2024/0082834 A1 Mar. 14, 2024

(30) Foreign Application Priority Data

Dec. 17, 2019 (JP) ................................ 2019-227210

(51) Int. Cl.
*B01L 3/00* (2006.01)

(52) U.S. Cl.
CPC ......... *B01L 3/50* (2013.01); *B01L 2300/0609* (2013.01)

(58) Field of Classification Search
CPC ........................... B01L 3/50; B01L 2300/0609
See application file for complete search history.

(56) References Cited

U.S. PATENT DOCUMENTS 1,002,910 A * 9/1911 Foote ..................... G09B 23/36 359/398
6,411,434 B1 * 6/2002 Eastman ............ G02B 21/0012 359/398

(Continued)

FOREIGN PATENT DOCUMENTS

CN 102384887 A 3/2012
CN 103954659 A 7/2014

(Continued)

OTHER PUBLICATIONS

English-language translation of International Preliminary Report on Patentability (IPRP) dated Jun. 30, 2022 that issued in WO Patent Application No. PCT/JP2020/027687.

*Primary Examiner* — Jill A Warden
*Assistant Examiner* — Alex Ramirez
(74) *Attorney, Agent, or Firm* — Faegre Drinker Biddle & Reath LLP

(57) ABSTRACT

A biological sample holding container includes: a container main body having a bottom surface portion having a placement region for a biological sample and a side surface portion provided on the bottom surface portion so as to surround the placement region; and an annular holding member insertable and removable inside the side surface portion. The holding member holds a film covering the biological sample on the placement region with the bottom surface portion by being inserted inside the side surface portion together with the film.

7 Claims, 7 Drawing Sheets

(56) References Cited

U.S. PATENT DOCUMENTS

| | | | | |
|---|---|---|---|---|
| 2015/0231628 | A1* | 8/2015 | Nozaki | B65B 3/04 53/473 |
| 2019/0250082 | A1 | 8/2019 | Karkouche | |

FOREIGN PATENT DOCUMENTS

| | | | |
|---|---|---|---|
| CN | 104517791 | A | 4/2015 |
| CN | 206336832 | U | 7/2017 |
| JP | S58-180468 | U | 12/1983 |
| JP | 2000-321183 | A | 11/2000 |
| JP | 2013-039103 | A | 2/2013 |
| JP | 2016-130673 | A | 7/2016 |
| KR | 10-2017-0052439 | A | 5/2017 |
| WO | WO-00/049392 | A1 | 8/2000 |

* cited by examiner

BIOLOGICAL SAMPLE HOLDING CONTAINER AND BIOLOGICAL SAMPLE HOLDING METHOD

TECHNICAL FIELD

The present disclosure relates to a biological sample holding container and a biological sample holding method.

BACKGROUND ART

In observing the fluorescence of a biological sample immersed in a liquid reagent, the buoyancy received from the reagent may cause the biological sample to float and affect the result of the fluorescence observation. In many cases, a biological sample contains fat and tends to float in a liquid. In, for example, the sample holding container for microscopic observation described in Patent Literature 1, a lid member is inserted into a container main body capable of holding a biological sample and a solution and the biological sample is sandwiched between the inner surface of the container main body and the lid member so that the floating of the biological sample is prevented.

CITATION LIST

Patent Literature

Patent Literature 1: Japanese Unexamined Patent Publication No. 2016-130673

SUMMARY OF INVENTION

Technical Problem

As for the method described in Patent Literature 1, excessive pressure may be applied to the biological sample and the biological sample may be deformed when the lid member is inserted. The deformation of the biological sample may cause pseudofluorescence and lead to a decline in the precision of fluorescence observation. Holding with a tape or a needle is conceivable as another method for suppressing the floating of a biological sample. However, fixing with a tape may cause a gradual decline in holding force with respect to the biological sample in a liquid reagent. In addition, holding with a needle is problematic in that the biological sample is scratched.

The present disclosure has been made to solve the above problems, and an object of the present disclosure is to provide a biological sample holding container and a biological sample holding method allowing a biological sample in a liquid reagent to be held without a scratch or deformation.

Solution to Problem

A biological sample holding container according to one aspect of the present disclosure holds a biological sample with a film. The biological sample holding container includes: a container main body having a bottom surface portion having a placement region for the biological sample and a side surface portion provided on the bottom surface portion so as to surround the placement region; and an annular holding member insertable and removable inside the side surface portion. The holding member holds the film covering the biological sample on the placement region with the bottom surface portion by being inserted inside the side surface portion together with the film.

In this biological sample holding container, the holding member is inserted inside the side surface portion of the container main body together with the film, and thus the film covering the biological sample is held between the holding member and the bottom surface portion. By indirectly holding the biological sample via the film, it is possible to avoid applying excessive pressure to the biological sample. Accordingly, the biological sample holding container is capable of holding the biological sample in a liquid reagent without causing deformation, a scratch, or the like.

The holding member may have an outer shape corresponding to an inner shape of the side surface portion, and a dimensional difference between the inner shape of the side surface portion and the outer shape of the holding member may be larger than a thickness of the film. In this case, the film can be easily inserted to the back when the holding member is inserted inside the side surface portion together with the film and the film can be brought close to the biological sample when the biological sample on the placement region is covered with the film. Accordingly, the floating of the biological sample in the liquid reagent can be suppressed more reliably.

A height of the holding member may be equal to or less than a height of the side surface portion from the bottom surface portion. In this case, it is possible to prevent the holding member from blocking light used for fluorescence observation.

The holding member may have a handle portion protruding beyond the side surface portion in a state of being inserted inside the side surface portion. As a result, it is possible to improve the workability of inserting and removing the holding member with respect to the container main body.

The bottom surface portion may be formed of a light-transmitting material. In this case, the fluorescence of the biological sample can be observed from the bottom surface portion side of the container main body.

The film may be a reticulated film. In this case, the liquid reagent can be injected into the container main body through the film.

The film may be larger in area than the bottom surface portion. As a result, the edge portion of the film can be easily held by the holding member when the holding member is inserted inside the side surface portion together with the film.

The film may be formed of a light-transmitting material. In this case, the fluorescence of the biological sample can be observed through the film.

A biological sample holding method according to one aspect of the present disclosure is a biological sample holding method for holding a biological sample with a film. The biological sample holding method includes: a sample placement step of placing the biological sample on a placement region using a container main body having a bottom surface portion having the placement region for the biological sample and a side surface portion provided on the bottom surface portion so as to surround the placement region; a film disposition step of disposing the film on a top surface of the side surface portion; and a film holding step of covering the biological sample on the placement region with the film and holding the film between a holding member and the bottom surface portion by inserting the holding member inside the side surface portion together with the film using a annular holding member insertable and removable inside the side surface portion.

In this biological sample holding method, the holding member is inserted inside the side surface portion of the container main body together with the film, and thus the film covering the biological sample is held between the holding member and the bottom surface portion. By indirectly holding the biological sample via the film, it is possible to avoid applying excessive pressure to the biological sample. Accordingly, by the biological sample holding method, it is possible to hold the biological sample in a liquid reagent without causing deformation, a scratch, or the like.

The biological sample holding method may further include a liquid injection step of injecting a liquid reagent into the container main body after the film holding step. In this case, biological sample fluorescence observation can be initiated immediately after reagent-based reaction initiation and the point in time of fluorescence observation and measurement initiation is grasped with ease.

The biological sample holding method may further include a liquid injection step of injecting a liquid reagent into the container main body before the film disposition step. In this case, the liquid reagent is injected into the container main body before the film is disposed, and thus the amount by which the liquid reagent is injected is grasped with ease.

A holding member having an outer shape corresponding to an inner shape of the side surface portion and having a dimensional difference from the inner shape of the side surface portion larger than a thickness of the film may be used as the holding member. In this case, the film can be easily inserted to the back when the holding member is inserted inside the side surface portion together with the film and the film can be brought close to the biological sample on the placement region. Accordingly, the floating of the biological sample in the liquid reagent can be suppressed more reliably.

A holding member having a height equal to or less than a height of the side surface portion from the bottom surface portion may be used as the holding member. In this case, it is possible to prevent the holding member from blocking light used for fluorescence observation.

A holding member having a handle portion protruding beyond the side surface portion in a state of being inserted inside the side surface portion may be used as the holding member. As a result, it is possible to improve the workability of inserting and removing the holding member with respect to the container main body.

A holding member where the bottom surface portion is formed of a light-transmitting material may be used as the holding member. In this case, the fluorescence of the biological sample can be observed from the bottom surface portion side of the container main body.

A reticulated film may be used as the film. In this case, the liquid reagent can be injected into the container main body through the film.

A film larger in area than the bottom surface portion may be used as the film. As a result, the edge portion of the film can be easily held by the holding member when the holding member is inserted inside the side surface portion together with the film.

A film formed of a light-transmitting material may be used as the film. In this case, the fluorescence of the biological sample can be observed through the film.

Advantageous Effects of Invention

According to the present disclosure, it is possible to hold a biological sample immersed in a liquid reagent without causing deformation, a scratch, or the like.

DESCRIPTION OF EMBODIMENTS

Hereinafter, preferred embodiments of a biological sample holding container and a biological sample holding method according to one aspect of the present disclosure will be described in detail with reference to the drawings.

Figure 1:
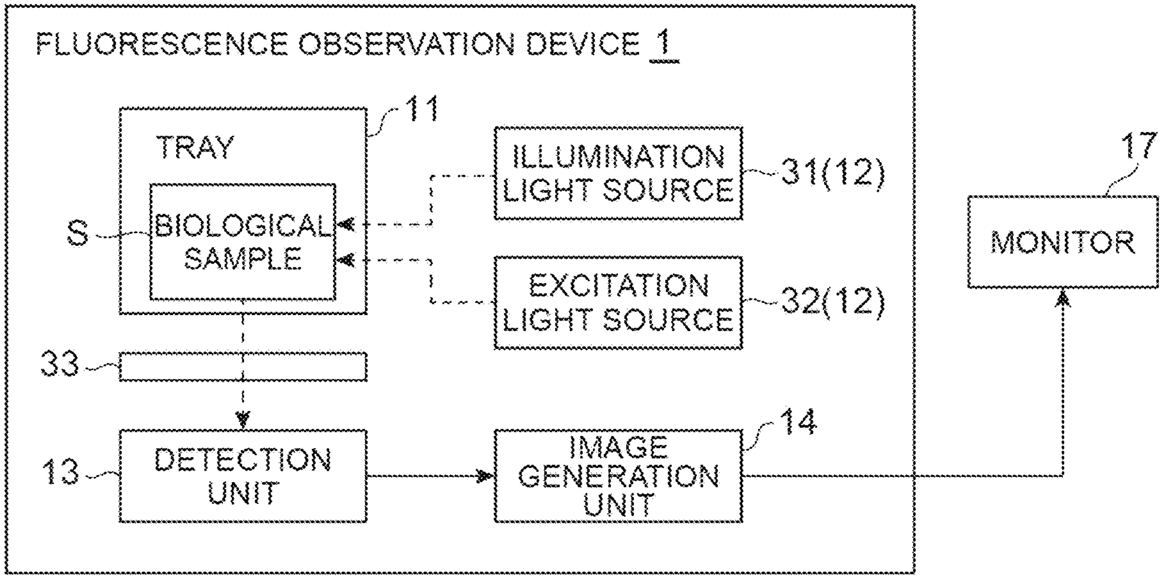
FIG. 1 is a block diagram illustrating an embodiment of a fluorescence observation device to which a biological sample holding container is applied.

FIG. 1 is a block diagram illustrating an embodiment of a fluorescence observation device to which the biological sample holding container is applied. A fluorescence observation device 1 illustrated in FIG. 1 is configured as a device for observing the fluorescence of a biological sample S immersed in a liquid reagent. In the present embodiment, a stump inspection of tumor tissue excised from a patient by surgery is exemplified as an application example of the fluorescence observation device 1. In the stump inspection, the biological sample S containing the tumor tissue is stained with a fluorescent probe. The behavior of fluorescence intensity over time differs between the tumor tissue and normal tissue. Accordingly, it is possible to determine the presence or absence of residual tumor tissue in the biological sample S by measuring the fluorescence intensity of the biological sample S after a predetermined time has elapsed from the staining with the fluorescent probe.

The fluorescent probe is a substance that generates strong fluorescence by changing in molecular structure by reacting with a specific substance. Examples of the fluorescent probe used for the stump inspection include gGlu-HMRG, which is a liquid fluorescent substance. Before the reaction, the gGlu-HMRG is colorless and transparent and exhibits water solubility. The gGlu-HMRG that has reacted with an enzyme derived from the tumor tissue becomes colored and visualized. In addition, the gGlu-HMRG that has reacted with the enzyme derived from tumor tissue changes from water-soluble to hydrophobic and exhibits the property of penetrating a cell membrane and staying in a cell. Accordingly, by using the gGlu-HMRG, precise detection is possible even for a minute tumor tissue of, for example, approximately several millimeters.

As illustrated in FIG. 1, the fluorescence observation device 1 includes a tray 11, a light source unit 12, a detection unit 13, and an image generation unit 14. These configurations are disposed in a housing 16 (see FIG. 2), which blocks light from the outside. The fluorescence observation device 1 is connected to a monitor 17 by wire or wirelessly so as to be capable of information communication. The monitor 17 may be configured by, for example, a personal computer or a smart device (smartphone, tablet terminal).

Figure 2:
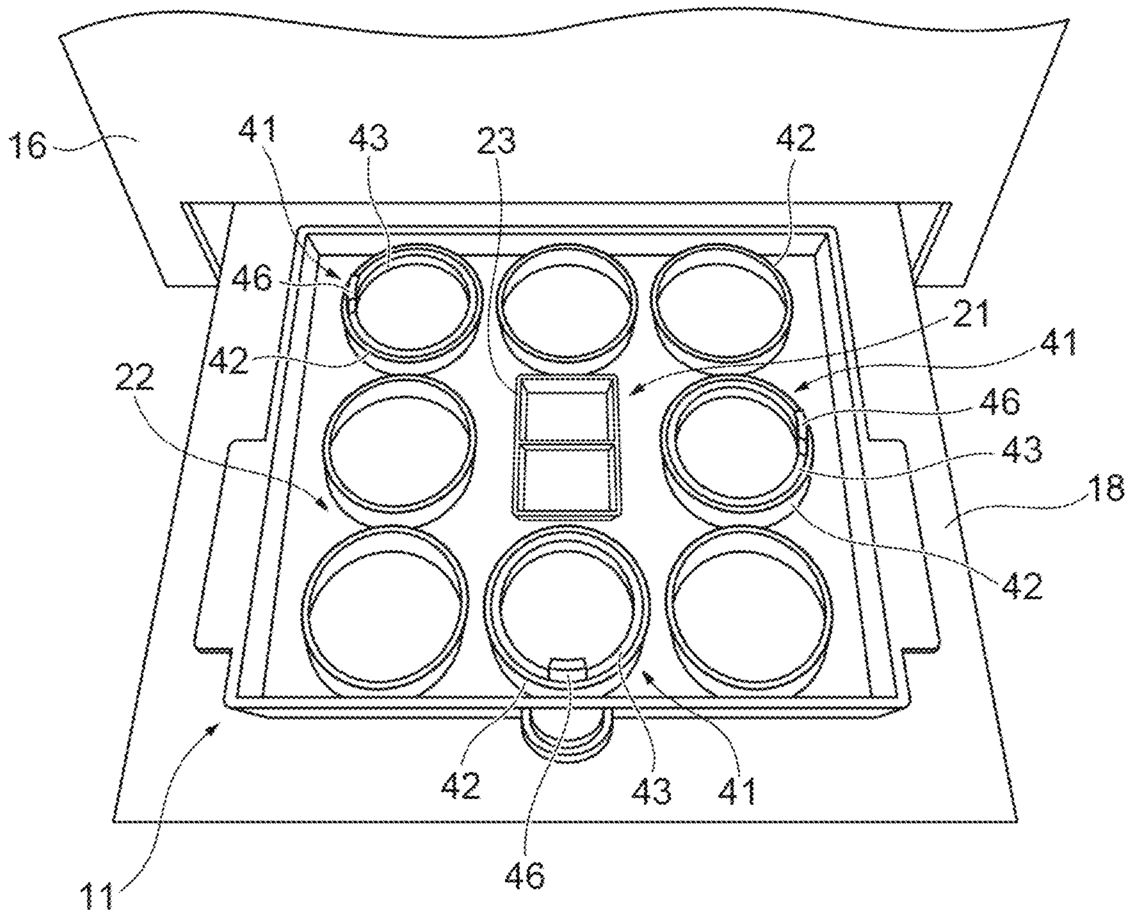
FIG. 2 is a perspective view illustrating an example of the biological sample holding container.

The tray 11 is a member for setting the biological sample S with respect to the fluorescence observation device 1. As illustrated in FIG. 2, the tray 11 is, for example, formed of resin in a rectangular plate shape in a plan view. Preferably, the tray 11 has a dark color such as black in order to ensure sensitivity in observing the fluorescence of the biological sample S. The tray 11 can be placed on the top surface of a drawer portion 18 provided in, for example, the lower portion of one side surface of the housing 16. By moving the drawer portion 18 in and out, the biological sample S set in the tray 11 can be moved forward and backward with respect to the position of inspection in the housing 16.

As illustrated in FIG. 2, one surface side of the tray 11 is provided with a reference region 21 where a reference plate (not illustrated) is disposed and sample regions 22 where biological sample holding containers 41 are disposed. In the present embodiment, the reference region 21 and the sample regions 22 are disposed in a matrix shape. The sample regions 22 are provided in eight places so as to surround the reference region 21. With the sample regions 22, up to eight biological samples S can be observed at the same time.

The reference region 21 is partitioned with respect to the sample regions 22 by a partition member 23. The partition member 23 is, for example, formed of resin integrally with the main body of the tray 11. The reference plate disposed in the reference region 21 is a plate-shaped member that generates fluorescence of reference intensity by irradiation with excitation light. The fluorescence intensity of the reference plate does not fluctuate with time whereas the fluorescence intensity of the tumor tissue fluctuates with time. Accordingly, by referring to the fluorescence intensity of the reference plate, it is possible to carry out high-precision fluorescence observation even when the fluorescence intensity of the biological sample S slightly changes over time. In the example of FIG. 2, the reference region 21 is further divided into two regions by the partition member 23. The reference plate may be disposed in any region.

As illustrated in FIG. 1, the light source unit 12 includes an illumination light source 31 and an excitation light source 32. The illumination light source 31 and the excitation light source 32 are, for example, disposed above the position of disposition of the tray 11 in the housing 16. The illumination light source 31 is a white light source configured by, for example, a lamp. The illumination light source 31 irradiates the biological sample S on the tray 11 with illumination light from above. The excitation light source 32 is configured by, for example, an LED. The excitation light source 32 irradiates the biological sample S on the tray 11 with excitation light from above.

The detection unit 13 is configured to include an imaging element such as a CCD image sensor and a CMOS image sensor. The detection unit 13 is, for example, disposed above the position of disposition of the tray 11 in the housing 16. The detection unit 13 has a detection surface (not illustrated) disposed downward so as to face the tray 11. If necessary, the detection unit 13 may include an optical filter 33 that transmits fluorescence of a wavelength generated in the biological sample S. The detection unit 13 outputs, to the image generation unit 14, a detection signal indicating the result of imaging of the biological sample S by the illumination light and a detection signal indicating the result of imaging of the fluorescence generated in the biological sample S by the irradiation with the excitation light.

The image generation unit 14 is configured by, for example, a field-programmable gate array (FPGA) or a microcomputer including a processor and a memory. The image generation unit 14 generates a fluorescent image of the biological sample S based on the detection signal from the detection unit 13. In the present embodiment, the image generation unit 14 generates a visible image or an appearance image based on the detection signal indicating the result of imaging of the biological sample S by the illumination light and generates a fluorescent image based on the detection signal indicating the result of imaging of the fluorescence generated in the biological sample S. The image generation unit 14 generates a superimposed image in which the visible image or the appearance image and the fluorescent image are superimposed and outputs the superimposed image to the monitor 17.

The image generation unit 14 may have a function of performing shading correction on the fluorescent image (superimposed image). In this case, the image generation unit 14 has in advance a brightness distribution for fluorescence detection at the detection unit 13 based on, for example, the result of imaging of the reference plate equivalent in area to the tray 11 and executes the shading correction on the fluorescent image (superimposed image) based on the brightness distribution. By executing the shading correction, the effect of the brightness distribution of the fluorescence attributable to the configuration of the detection unit 13 is canceled out and the precision of the fluorescence observation can be improved.

Next, the biological sample holding container 41 applied to the fluorescence observation device 1 will be described in detail.

Figure 3:
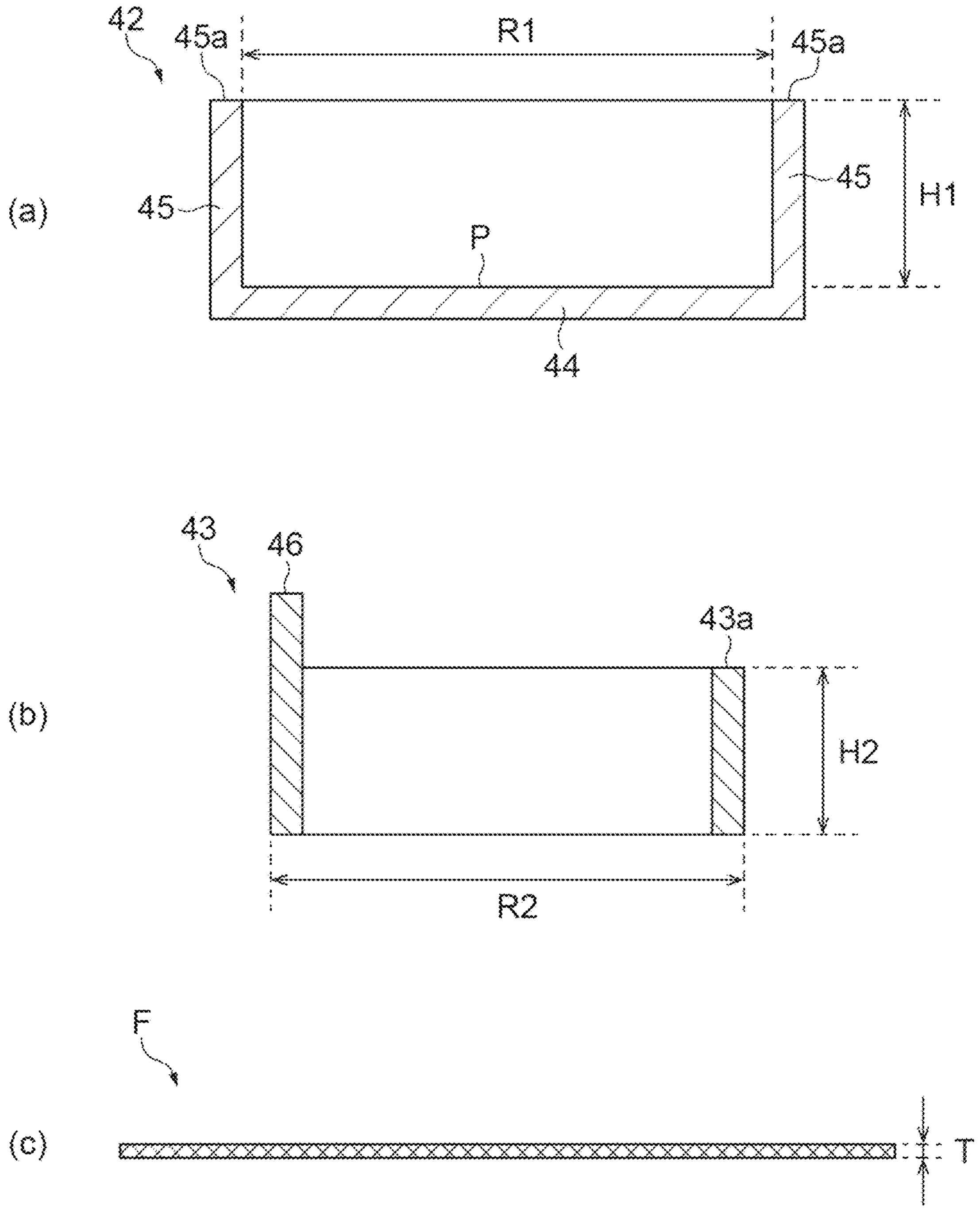
FIG. 3 is a schematic cross-sectional view illustrating the configuration of a container main body, a holding member, and a film.

The biological sample holding container 41 disposed in the sample region 22 of the tray 11 holds the biological sample S with a film F. As illustrated in FIGS. 2 and 3(*a*), the biological sample holding container 41 is configured by a container main body 42 and a holding member 43. The container main body 42 has a circular shape in a plan view and has a bottom surface portion 44 having a placement region P for the biological sample S and a side surface portion 45 provided on the peripheral edge of the bottom surface portion 44 so as to surround the placement region P. In the present embodiment, the container main body 42 is formed of resin integrally with the main body of the tray 11. In other words, in the present embodiment, the bottom surface portion 44 of the container main body 42 is configured by one surface side of the tray 11 and the side surface portion 45 is in a state of protruding from one surface side of the tray (see FIG. 2).

As illustrated in FIGS. 2 and 3(*b*), the holding member 43 is a circular ring-shaped member having an outer shape corresponding to the inner shape of the side surface portion 45 and can be inserted and removed inside the side surface portion 45. The holding member 43 is made of, for example, the same resin as the resin by which the tray 11 and the container main body 42 are configured. In the present embodiment, the dimensional difference between the inner shape of the side surface portion 45 and the outer shape of the holding member 43 is larger than the thickness of the film F. In other words, in the present embodiment, the difference between an inner diameter R1 of the side surface portion 45 and an outer diameter R2 of the holding member 43 is larger than a thickness T of the film F and, when the holding member 43 is inserted inside the side surface portion 45, a gap W (see FIG. 6(*a*)) larger than the thickness of the film F is formed between the inner surface of the side surface portion 45 and the outer surface of the holding member 43.

A height H2 of the holding member 43 is equal to or less than a height H1 of the side surface portion 45 from the bottom surface portion 44 in the container main body 42. In the present embodiment, the height H2 of the holding member 43 is equal to the height H1 of the side surface portion 45 from the bottom surface portion 44 and, with the holding member 43 inserted inside the side surface portion 45, a top surface 45*a* of the side surface portion 45 and one end surface 43*a* of the holding member 43 in the longitudinal direction are flush with each other. In addition, a handle portion 46 is provided on one end surface 43*a* of the holding member 43 in the longitudinal direction. The handle portion 46 is configured by a protruding piece where a part of one end surface 43*a* of the holding member 43 in the longitudinal direction protrudes. The handle portion 46 protrudes upward beyond the top surface 45*a* of the side surface portion 45 with the holding member 43 inserted inside the side surface portion 45. A plurality of the protruding pieces by which the handle portion 46 is configured may be provided on one end surface 43*a* of the holding member 43 in the longitudinal direction.

As illustrated in FIG. 3(*c*), the film F used in holding the biological sample S has a circular shape larger in area than the bottom surface portion 44. Examples of the constituent material of the film F include polyamide synthetic resin and cellulose. In addition, a cloth material such as gauze may be used as the film F. In the present embodiment, the film F is a reticulated film formed of a light-transmitting material. Preferably, the film F has sufficiently small autofluorescence. The film F transmits excitation light, illumination light, and fluorescence generated by excitation light and is liquid reagent-permeable.

Figure 4:
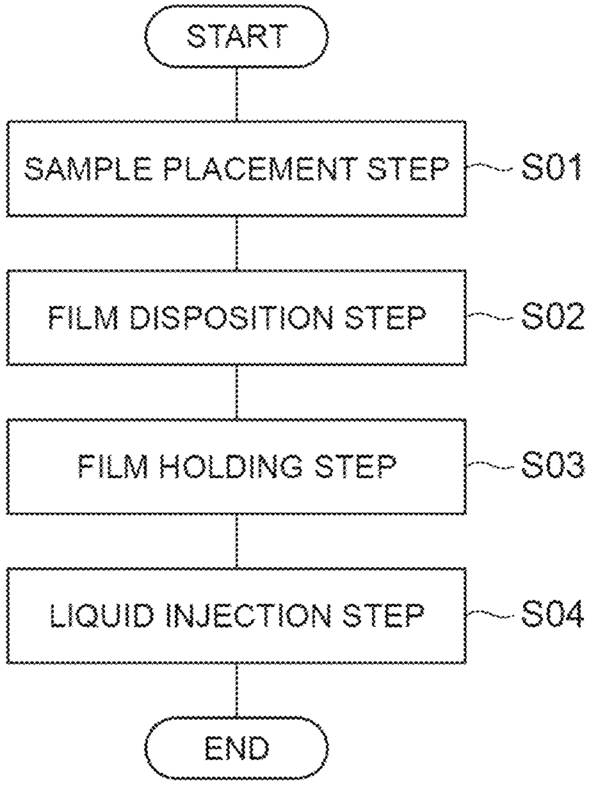
FIG. 4 is a flowchart illustrating an example of a biological sample holding method.

FIG. 4 is a flowchart illustrating an example of the biological sample holding method. As illustrated in FIG. 4, the biological sample holding method for holding the biological sample S with the film F includes a sample placement step (Step S01), a film disposition step (Step S02), a film holding step (Step S03), and a liquid injection step (Step S04).

Figure 5:
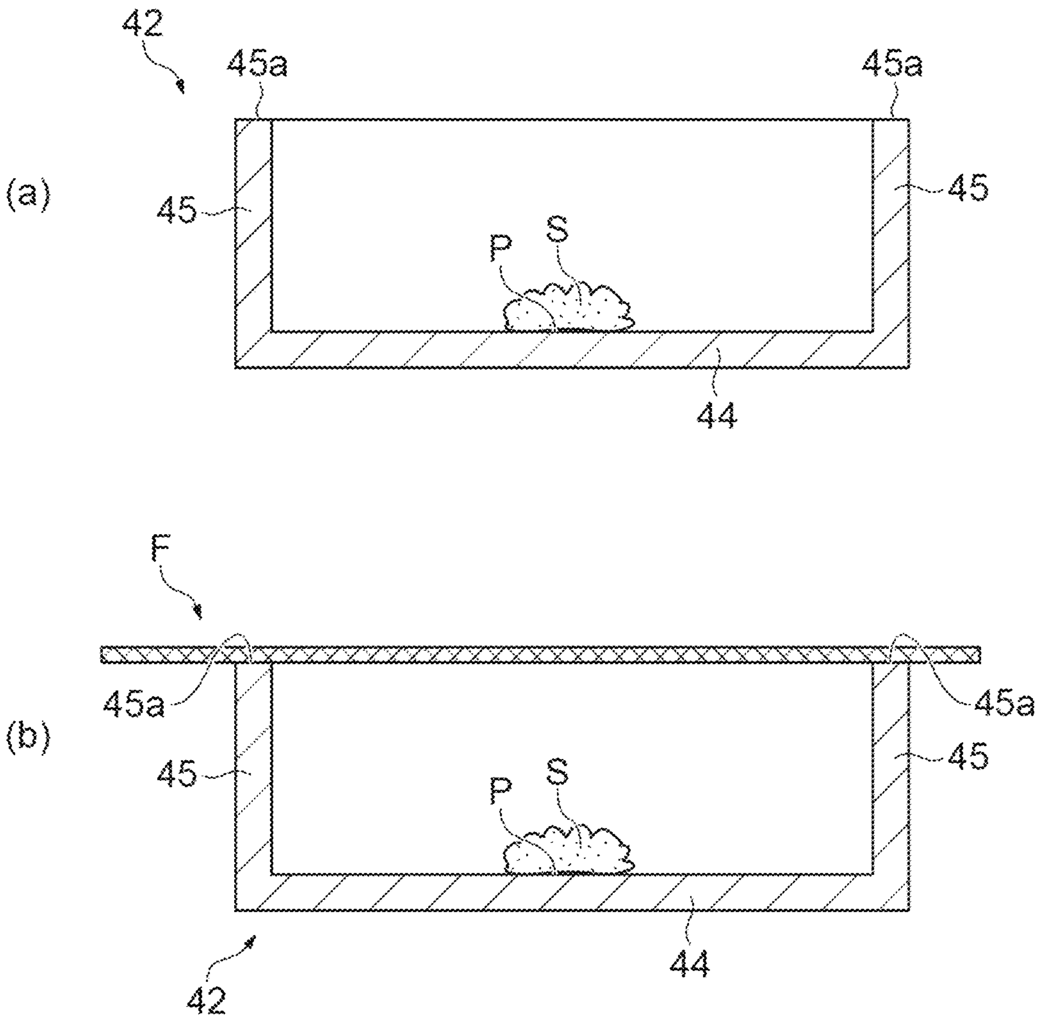
FIG. 5(*a*) is a schematic cross-sectional view illustrating a sample placement step, and FIG. 5(*b*) is a schematic cross-sectional view illustrating a film disposition step.

As illustrated in FIG. 5(*a*), in the sample placement step, the biological sample S is placed on the placement region P on the bottom surface portion 44 of the container main body 42. As illustrated in FIG. 5(*b*), in the film disposition step, the film F is disposed on the top surface 45*a* of the side surface portion 45 of the container main body 42. In the present embodiment, the film F is larger in area than the bottom surface portion 44. Accordingly, when the film F is disposed on the top surface 45*a* of the side surface portion 45, a peripheral edge portion Fa of the film F protrudes to the outside beyond the side surface portion 45.

Figure 6:
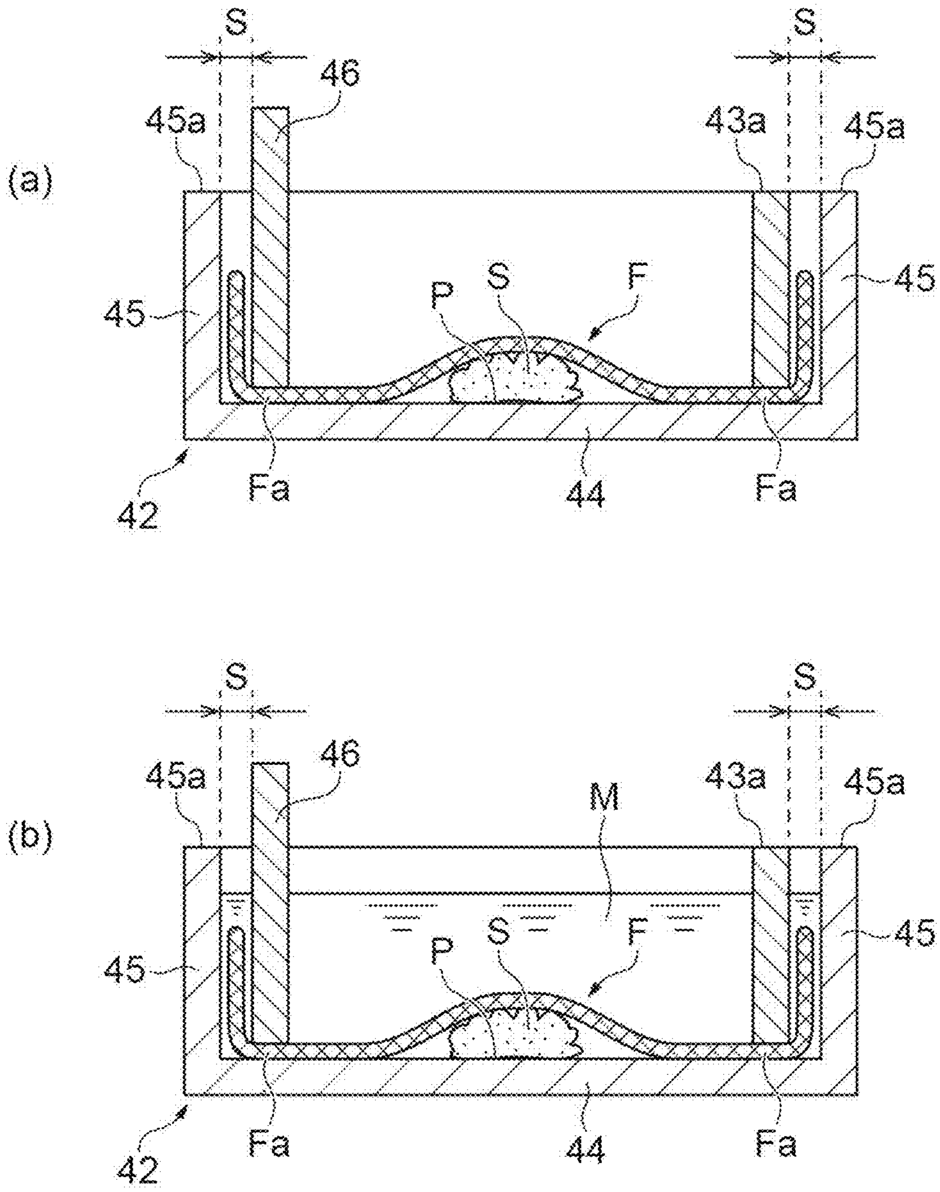
FIG. 6(*a*) is a schematic cross-sectional view illustrating a film holding step, and FIG. 6(*b*) is a schematic cross-sectional view illustrating a liquid injection step.

As illustrated in FIG. 6(*a*), in the film holding step, the holding member 43 is inserted inside the side surface portion 45 together with the film F. As a result, the film F is pushed into the back of the container main body 42 by the holding member 43 and the biological sample S on the placement region P is covered with the film F. In addition, the peripheral edge portion Fa of the film F is held between the holding member 43 and the bottom surface portion 44 and the shape of the film F covering the biological sample S is maintained. In the present embodiment, the film F is larger in area than the bottom surface portion 44. Accordingly, the part of the peripheral edge portion Fa of the film F that is outside the holding position of the holding member 43 and the bottom surface portion 44 is bent along the side surface portion 45 and is positioned in the gap W between the inner surface of the side surface portion 45 and the outer surface of the holding member 43.

As illustrated in FIG. 6(*b*), in the liquid injection step, a liquid reagent M is injected into the container main body 42. gGlu-HMRG as an example is used for the injection of the reagent M. In the present embodiment, the film F is a reticulated film and the reagent M is capable of permeating through the film F. Accordingly, by dripping the reagent M onto the film F, the biological sample S on the placement region P can be immersed in the reagent M. The reagent M causes buoyancy to act on the biological sample S immersed in the reagent M. However, in the present embodiment, the biological sample S is covered with the film F and the peripheral edge portion Fa of the film F is held by the holding member 43 and the bottom surface portion 44, and thus the floating of the biological sample S during fluorescence observation is suppressed.

As described above, in this biological sample holding container, the holding member 43 is inserted inside the side surface portion 45 of the container main body 42 together with the film F, and thus the film F covering the biological sample S is held between the holding member 43 and the bottom surface portion 44. By indirectly holding the biological sample S via the film F, it is possible to avoid applying excessive pressure to the biological sample S. Accordingly, the biological sample holding container 41 is capable of holding the biological sample S in the liquid reagent M without causing deformation, a scratch, or the like. In addition, unlike when the biological sample S is fixed with a tape, the holding force with respect to the biological sample S in the reagent M does not gradually decrease. Simply by inserting the holding member 43 into the side surface portion 45 together with the film F, the fixing of the biological sample S using the film F and the holding of the film F using the holding member 43 can be performed at the same time and preparation can be expedited in performing fluorescence observation.

In addition, in the biological sample holding container 41, the dimensional difference between the inner shape of the side surface portion 45 and the outer shape of the holding member 43 is larger than the thickness of the film F. As a result, the film F can be easily inserted to the back when the holding member 43 is inserted inside the side surface portion 45 together with the film F and the film F can be brought close to the biological sample S when the biological sample S on the placement region P is covered with the film F. Accordingly, the floating of the biological sample S in the liquid reagent M can be suppressed more reliably.

In addition, in the biological sample holding container 41, the height H2 of the holding member 43 is equal to or less than the height H1 of the side surface portion 45 from the bottom surface portion 44. In this case, it is possible to prevent the holding member 43 from blocking the light used for the fluorescence observation (excitation light, illumination light, and fluorescence generated by excitation light).

In addition, in the biological sample holding container 41, the holding member 43 is provided with the handle portion 46 protruding beyond the side surface portion 45 in the state of insertion inside the side surface portion 45. As a result, it is possible to improve the workability of inserting and removing the holding member 43 with respect to the container main body 42.

In the present embodiment, the film F is a reticulated film. In this case, the liquid reagent M can be injected into the container main body 42 through the film F. In addition, the film F is larger in area than the bottom surface portion 44. As a result, the peripheral edge portion Fa of the film F can be easily held by the holding member 43 when the holding member 43 is inserted inside the side surface portion 45 together with the film F. Further, the film F is formed of a light-transmitting material. As a result, the fluorescence of the biological sample S can be observed through the film even in a state where the biological sample S is covered with the film F.

The present disclosure is not limited to the above embodiment. For example, the container main body 42 and the holding member 43 may have another shape such as a rectangular ring shape, a triangular ring shape, and an elliptical ring shape although both the container main body 42 and the holding member 43 in the above embodiment have a circular ring shape in a plan view. The shapes of the container main body 42 and the holding member 43 may be different from each other. The holding member 43 does not necessarily have to have a closed shape in a plan view. The holding member 43 may have a partially interrupted shape such as a C shape. In addition, the container main body 42 and the tray 11 may be configured separately although the plurality of container main bodies 42 in the above embodiment are formed integrally with the tray 11.

Figure 7:
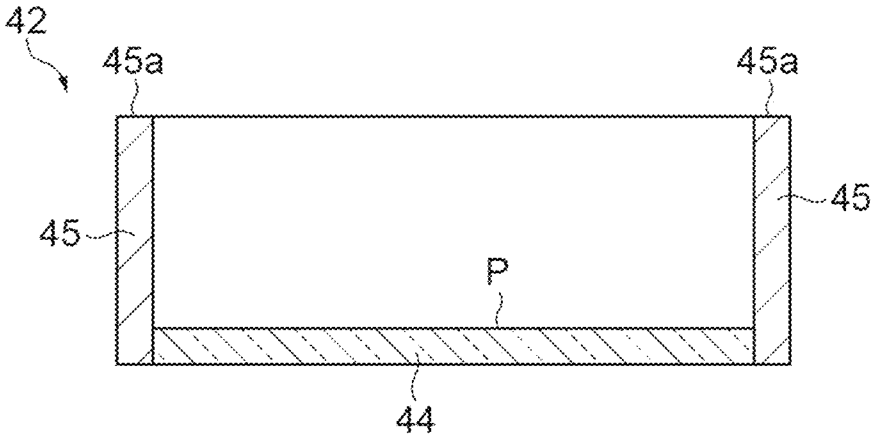
FIG. 7 is a schematic cross-sectional view illustrating another example of the container main body.

In addition, the bottom surface portion 44 in the container main body 42 may be formed of a light-transmitting material as illustrated in FIG. 7. In this case, examples of the material by which the bottom surface portion 44 is configured include optical glass and transparent acrylic. When the bottom surface portion 44 is made of a light-transmitting material, the fluorescence of the biological sample S can be observed from the bottom surface portion 44 side.

In addition, the liquid injection step may be carried out as a process preceding the film disposition step although the liquid injection step in the above embodiment is carried out as a process following the film holding step. In this case, the liquid injection step may be performed before the sample placement step or the liquid injection step may be performed between the sample placement step and the film disposition step. In this case, the liquid reagent M is injected into the container main body 42 before the film F is disposed, and thus the amount by which the liquid reagent M is injected is grasped with ease.

The film F does not necessarily have to be a reticulated film. Even when the film F itself does not allow the reagent M to permeate, the reagent M is capable of infiltrating over time into the biological sample S side inside the film F from, for example, the slight gap between the holding member 43 and the bottom surface portion 44. The holding member 43 may be configured to have, for example, a notch provided in the end surface of the holding member 43 that faces the bottom surface portion 44 and serving as an infiltration path for the reagent M.

REFERENCE SIGNS LIST

41: biological sample holding container, 42: container main body, 43: holding member, 44: bottom surface portion, 45: side surface portion, 46: handle portion, F: film, P: placement region, S: biological sample.

The invention claimed is:

1. A biological sample holding container holding a biological sample with a film, the biological sample holding container comprising:

a container main body having a bottom surface portion having a placement region for the biological sample and a side surface portion having a first end provided on the bottom surface portion so as to surround the placement region, the side surface portion having a second end opposite the first end; and an annular holding member insertable and removable inside the side surface portion, wherein the annular holding member holds the film covering the biological sample on the placement region with the bottom surface portion by being inserted inside the side surface portion together with the film, and wherein the film and the annular holding member are separate bodies, and wherein the annular holding member has a handle portion protruding beyond the second end of the side surface portion in a state of being inserted inside the side surface portion.

2. The biological sample holding container according to claim 1, wherein the annular holding member has an outer shape corresponding to an inner shape of the side surface portion, and a dimensional difference between the inner shape of the side surface portion and the outer shape of the annular holding member is larger than a thickness of the film.

3. The biological sample holding container according to claim 1, wherein a height of the annular holding member is equal to or less than a height of the side surface portion from the bottom surface portion.

4. The biological sample holding container according to claim 1, wherein the bottom surface portion is formed of a light-transmitting material.

5. The biological sample holding container according to claim 1, wherein the film is a reticulated film.

6. The biological sample holding container according to claim 1, wherein the film is larger in area than the bottom surface portion.

7. The biological sample holding container according to claim 1, wherein the film is formed of a light-transmitting material.

* * * * *